(12) United States Patent
Booth et al.

(10) Patent No.: US 10,960,794 B1
(45) Date of Patent: Mar. 30, 2021

(54) SEAT ASSEMBLY

(71) Applicant: GM Global Technology Operations LLC, Detroit, MI (US)

(72) Inventors: Daniel W. Booth, Troy, MI (US); Kelly T. Hagelthorn, Brighton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 2 days.

(21) Appl. No.: 16/674,597

(22) Filed: Nov. 5, 2019

(51) Int. Cl.
*B60N 2/56* (2006.01)
*B60N 2/90* (2018.01)
*B60N 2/22* (2006.01)

(52) U.S. Cl.
CPC ............. *B60N 2/5621* (2013.01); *B60N 2/22* (2013.01); *B60N 2/986* (2018.02)

(58) Field of Classification Search
CPC ......... B60N 2/5621; B60N 2/986; B60N 2/22
See application file for complete search history.

(56) References Cited

U.S. PATENT DOCUMENTS

| | | | | |
|---|---|---|---|---|
| 3,837,706 A | * | 9/1974 | Suttles | B60N 2/4256 297/464 |
| 3,924,893 A | * | 12/1975 | Ferrara | B60N 2/686 297/452.46 |
| 4,615,561 A | * | 10/1986 | Nomura | A47C 7/74 297/243 |
| 5,769,498 A | * | 6/1998 | Smith | B60N 2/643 297/440.1 |
| 10,414,301 B2 | * | 9/2019 | Kitaguchi | B60K 1/04 |
| 10,549,658 B2 | * | 2/2020 | Frye | B60N 2/986 |
| 2007/0138855 A1 | * | 6/2007 | Kespohl | A47C 7/02 297/452.18 |
| 2018/0160816 A1 | * | 6/2018 | Akaike | A47C 7/744 |
| 2018/0281642 A1 | * | 10/2018 | Kato | B60N 2/5657 |
| 2020/0198507 A1 | * | 6/2020 | Asahara | B60N 2/5607 |

* cited by examiner

*Primary Examiner* — Philip F Gabler (57) ABSTRACT

A seat assembly for a vehicle comprises a seat base fixed to a vehicle floor, a seat back pivotably disposed to the seat base, a first side bolster mounted onto a first side of the seat back, a second side bolster mounted onto a second side of the seat back, a third side bolster mounted onto a first side of the seat base, a fourth side bolster mounted onto a second side of the seat base, and a back insert mounted within the seat back, each of the side bolsters including a support member and an outer trim member, the support members each including a base, an outer frame and a plurality of interior support walls, the outer frame and the plurality of interior support walls defining a plurality of passages extending through each support member to allow light and air to pass through.

19 Claims, 5 Drawing Sheets

SEAT ASSEMBLY

The present disclosure relates to a seat assembly for a vehicle.

Seat assemblies are designed to provide support for a passenger seated therein. In many applications, such as in high performance automobiles, the support characteristics of the seat assembly are important to ensure the driver of the vehicle does not get jostled within the vehicle during high speed maneuvers. However, a seat that is designed to firmly conform to the passenger within the seat is difficult to enter and exit. Rigid features designed into a passenger seat assembly to provide support for the passenger get in the way, and the passenger is likely to bump into and slide against such features when entering and exiting the seat assembly. Furthermore, such features restrict air flow within the vehicle creating difficulties when managing thermal control within the vehicle and specifically for the passenger seated within the seat assembly.

Thus, while current seat assemblies achieve their intended purpose, there is a need for a new and improved seat assembly that includes side bolsters and a back insert to provide rigid support to lateral movement of an occupant within the seat assembly, provide compliance when an occupant bumps into the side bolsters when entering or exiting the seat assembly, and allows air and light to pass through.

SUMMARY

According to several aspects of the present disclosure, a seat assembly for a vehicle comprises a seat base adjustably fixed to a floor of the vehicle, and a seat back pivotably disposed to a rear edge of the seat base, and wherein the seat back includes a first side bolster on a first side of the seat back, the first side bolster adapted to provide support for a passenger seated in the seat assembly and to allow light and air to pass therethrough.

According to another aspect, the first side bolster includes a support member and an outer trim member, the support member including a base, and an outer frame, the outer frame and the base defining a passage extending through the first support member to allow light and air to pass through the first support member.

According to another aspect, the support member further includes at least one interior support wall, the outer frame, the base, and the at least one interior support wall defining a plurality of hexagonal shaped passages extending through the first support member to allow light and air to pass through the first support member.

According to another aspect, the at least one interior support wall is substantially parallel to a first axis.

According to another aspect, the base, the outer frame, and the at least one interior support wall have a thickness along the first axis, the thickness of the base, the outer frame, and the at least one interior support wall providing rigidity along the first axis and providing side support for an occupant of the seat assembly.

According to another aspect, the outer frame includes first and second angled side walls, the at least one interior support wall and the first and second angled side walls being angled relative to a second axis that is perpendicular to the first axis, further wherein force against the first side bolster along the second axis flexes the angled side walls and the at least one interior support wall allowing to first side bolster to partially collapse and provide cushioned compliance when an occupant bumps into the first side bolster when entering and exiting the seat assembly.

According to another aspect, the base of the first support member further includes a flange extending from a bottom edge of the base, the flange being attached to the seat back to secure the first side bolster onto the seat back.

According to another aspect, the flange is sewn to an outer covering of the seat back.

According to another aspect, the outer trim member includes a rigid substrate and an outer covering attached to a top surface of the rigid substrate, the rigid substrate including interlocking members on a bottom surface, the support member including an outer surface including corresponding interlocking members, the interlocking members of the rigid substrate engaging the corresponding interlocking members of the support member and securing the outer trim member to the support member.

According to another aspect, the rigid substrate includes male interlocking members extending from a bottom surface, and the outer surface of the support member includes corresponding female interlocking members formed therein.

According to another aspect, the outer trim member comprises a covering extending over the first side bolster, the outer trim attached to the seat back and the flange of the base.

According to another aspect, the outer trim includes a decorative mesh cover aligned with the passages formed within the support member, the mesh cover adapted to allow air and light to pass through the mesh cover and through the passages formed within the support member.

According to another aspect, the seat back further includes a second side bolster on a second side of the seat back, the second side bolster being substantially identical to the first side bolster.

According to another aspect, the seat base includes third and fourth side bolsters on opposing first and second sides of the seat base, the third and fourth side bolsters being substantially identical to the first and second side bolsters.

According to another aspect, the seat assembly further includes a back insert formed within the seat back, the seat back insert including a perimeter frame, and at least one interior support wall that define a plurality of back passages extending through the seat back to allow light and air to pass through the seat back.

According to several aspects of the present disclosure, a seat assembly for a vehicle comprises a seat base adjustably fixed to a floor of the vehicle, a seat back pivotably disposed to a rear edge of the seat base, a first side bolster mounted onto a first side of the seat back, a second side bolster mounted onto a second side of the seat back, a third side bolster mounted onto a first side of the seat base, a fourth side bolster mounted onto a second side of the seat base, and a back insert mounted within the seat back, each of the first, second, third and fourth side bolsters including a support member and an outer trim member, the support members each including a base, an outer frame and a plurality of interior support walls, the outer frame and the plurality of interior support walls defining a plurality of passages extending through each support member to allow light and air to pass through each of the support members.

According to another aspect, each of the plurality of interior support walls of the first side bolster are substantially parallel to a first axis and the base, the outer frame, and the plurality of interior walls of the first side bolster have a thickness along the first axis that provides rigidity along the first axis to provide side support for an occupant of the seat assembly, the outer frame including first and second angled side walls, the plurality of interior support walls and the first and second angled side walls of the first side bolster being angled relative to a second axis that is perpendicular to the first axis, further wherein force against the first side bolster along the second axis flexes the angled side walls and the plurality of interior support walls allowing the first side bolster to partially collapse and provide cushioned compliance when an occupant bumps into the first side bolster when entering and exiting the seat assembly, wherein, each of the plurality of interior support walls of the second side bolster are substantially parallel to a third axis and the base, the outer frame, and the plurality of interior support walls of the second side bolster have a thickness along the third axis that provides rigidity along the third axis to provide side support for an occupant of the seat assembly, the outer frame including first and second angled side walls, the plurality of interior walls and the first and second angled side walls of the second side bolster being angled relative to a fourth axis that is perpendicular to the third axis, further wherein force against the first side bolster along the fourth axis flexes the angled side walls and the plurality of interior support walls allowing the second side bolster to partially collapse and provide cushioned compliance when an occupant bumps into the second side bolster when entering and exiting the seat assembly, further wherein, each of the plurality of interior support walls of the third side bolster are substantially parallel to a fifth axis and the base, the outer frame, and the plurality of interior support walls of the third side bolster have a thickness along the fifth axis that provides rigidity along the fifth axis to provide side support for an occupant of the seat assembly, the outer frame including first and second angled side walls, the plurality of interior support walls and the first and second angled side walls of the third side bolster being angled relative to a sixth axis that is perpendicular to the fifth axis, further wherein force against the third side bolster along the sixth axis flexes the angled side walls and the plurality of interior support walls allowing the third side bolster to partially collapse and provide cushioned compliance when an occupant bumps into the third side bolster when entering and exiting the seat assembly, and further wherein, each of the plurality of interior support walls of the fourth side bolster are substantially parallel to a seventh axis and the base, the outer frame, and the plurality of interior support walls of the fourth side bolster have a thickness along the seventh axis that provides rigidity along the seventh axis to provide side support for an occupant of the seat assembly, the outer frame including first and second angled side walls, the plurality of interior support walls and the first and second angled side walls of the fourth side bolster being angled relative to an eighth axis that is perpendicular to the seventh axis, further wherein force against the fourth side bolster along the eighth axis flexes the angled side walls and the plurality of interior support walls allowing the fourth side bolster to partially collapse and provide cushioned compliance when an occupant bumps into the fourth side bolster when entering and exiting the seat assembly.

According to another aspect, the base of each of the support members of each of the first, second, third and fourth side bolsters further includes a flange extending from a bottom edge of the base, the flanges being attached to an outer covering of the seat, further wherein, the outer trim member of each of the first, second, third and fourth side bolsters includes a rigid substrate and an outer covering attached to a top surface of the rigid substrate, the rigid substrate of each outer trim member including interlocking members on a bottom surface, each of the support members including an outer surface including corresponding interlocking members, the interlocking members of the rigid substrate engaging the corresponding interlocking members of the support member and securing the outer trim members to the support members of each of the first, second, third and fourth side bolsters.

According to another aspect, the base of each of the support members of each of the first, second, third and fourth side bolsters further includes a flange extending from a bottom edge of the base, the flanges being attached to an outer covering of the seat, further wherein the outer trim member of each of the first, second, third and fourth side bolsters comprises a covering extending over the first side bolster, the outer trim attached to the seat and the flange of the base and including a decorative mesh cover aligned with the passages formed within the support member, the mesh cover adapted to allow air and light to pass through the mesh cover and through the passages formed within the support member.

According to another aspect, the back insert includes a perimeter frame, and at least one interior support wall that define a plurality of back passages extending through the seat back to allow light and air to pass through the seat back.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Referring to the Figures, a seat assembly 10 for a vehicle in accordance with the present disclosure comprises a seat base 12 adjustably fixed to a floor of the vehicle, and a seat back 14 pivotably disposed to a rear edge of the seat base 12. The seat back 14 includes a first side bolster 16 on a first side 18 of the seat back 12. The first side bolster 16 is adapted to provide support for a passenger seated in the seat assembly 10 and to allow light and air to pass therethrough.

Figure 1:
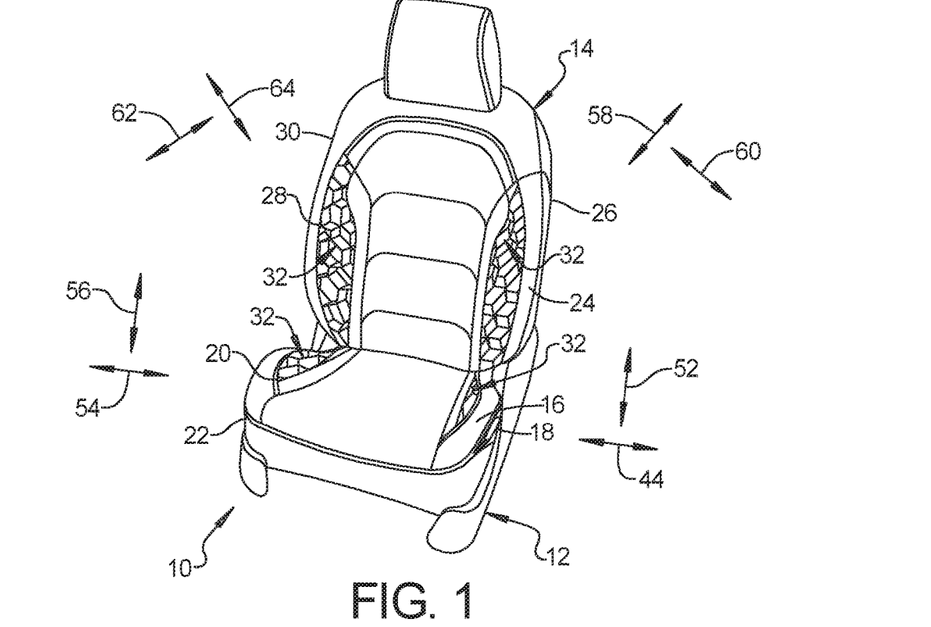
FIG. 1 is a perspective view of a seat assembly of the present disclosure according to an exemplary embodiment.

Referring to FIG. 1, a seat assembly 10 for a vehicle in accordance with an exemplary embodiment comprises a first side bolster 16 mounted onto a first side 18 of the seat back 14, a second side bolster 20 mounted onto a second side 22 of the seat back 14, a third side bolster 24 mounted onto a first side 26 of the seat base 12, and a fourth side bolster 28 mounted onto a second side 30 of the seat base 12. Structurally, the first, second, third and fourth side bolsters 16, 20, 24, 28 are identical to one another. The only differences are in the details of the shape, that depend upon where, specifically, the first, second, third and fourth side bolsters 16, 20, 24, 28 are mounted onto the seat assembly 10.

Figure 2:
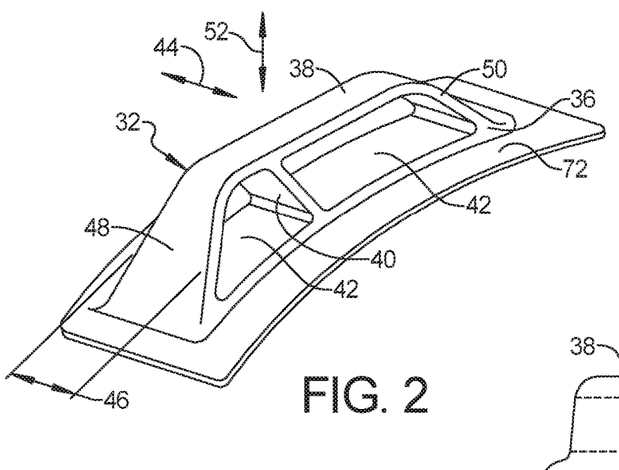
FIG. 2 is a perspective view of a side bolster according to an exemplary embodiment.

Each of the first, second, third and fourth side bolsters 16, 20, 24, 28 include a support member 32 and an outer trim member 34. Each support member 32 of each of the first, second, third and fourth side bolsters 16, 20, 24, 28 includes a base 36, and an outer frame 38 that defines a passage 42 extending through the support member 32 to allow light and air to pass therethrough. Referring to FIG. 2, a simplified exemplary embodiment includes a base 36, an outer frame 38, and a single interior support wall 40. The base 36, the outer frame 38 and the single interior support wall 40 define two passages 42 extending through the support member 32 to allow light and air to pass therethrough.

Referring again to FIG. 1, in the exemplary embodiment shown therein, each support member 32 of the first, second, third, and fourth side bolsters 16, 20, 24, 28 includes a plurality of interior support walls 40. The base 36, the outer frame 38 and the plurality of interior support walls 40 define a plurality of hexagonal shaped passages 42 extending therethrough to allow light and air to pass through each of the first, second, third and fourth side bolsters 16, 20, 24, 28.

Each of the plurality of interior support walls 40 of the first side bolster 16 are substantially parallel to a first axis 44. The base 36, the outer frame 38, and the plurality of interior support walls 40 of the first side bolster 16 have a thickness 46 along the first axis 44 that provides rigidity along the first axis 44 to provide lateral side support for an occupant of the seat assembly 10.

The outer frame 38 of the first side bolster 16 includes first and second angled side walls 48, 50. The plurality of interior support walls 40 and the first and second angled side walls 48, 50 of the first side bolster 16 are angled relative to a second axis 52 that is perpendicular to the first axis 44. When a passenger enters the vehicle and sits down into the seat assembly 10, the passenger may rub against or bump into the seat assembly 10. Force against the first side bolster 16 along the second axis 52 flexes the angled side walls 48, 50 and the plurality of interior support walls 40 allowing the first side bolster 16 to partially collapse. This provides cushioned compliance when a passenger bumps into the first side bolster 16 when entering and exiting the seat assembly 10.

Each of the plurality of interior support walls 40 of the second side bolster 20 are substantially parallel to a third axis 54. The base 36, the outer frame 38, and the plurality of interior support walls 40 of the second side bolster 20 have a thickness 46 along the third axis 54 that provides rigidity along the third axis 54 to provide lateral side support for an occupant of the seat assembly 10.

The outer frame 38 of the second side bolster 20 includes first and second angled side walls 48, 50. The plurality of interior support walls 40 and the first and second angled side walls 48, 50 of the second side bolster 20 are angled relative to a fourth axis 56 that is perpendicular to the third axis 54. Force against the second side bolster 20 along the fourth axis 56 flexes the angled side walls 48, 50 and the plurality of interior support walls 40 allowing the second side bolster 20 to partially collapse, providing cushioned compliance when a passenger makes contact with the second side bolster 20.

Each of the plurality of interior support walls 40 of the third side bolster 24 are substantially parallel to a fifth axis 58. The base 36, the outer frame 38, and the plurality of interior support walls 40 of the third side bolster 24 have a thickness 46 along the fifth axis 58 that provides rigidity along the fifth axis 58 to provide lateral side support for an occupant of the seat assembly 10.

The outer frame 38 of the third side bolster 24 includes first and second angled side walls 48, 50. The plurality of interior support walls 40 and the first and second angled side walls 48, 50 of the third side bolster 24 are angled relative to a sixth axis 60 that is perpendicular to the fifth axis 58. Force against the third side bolster 24 along the sixth axis 60 flexes the angled side walls 48, 50 and the plurality of interior support walls 40 allowing the third side bolster 24 to partially collapse, providing cushioned compliance when a passenger bumps into the third side bolster 24.

Each of the plurality of interior support walls 40 of the fourth side bolster 28 are substantially parallel to a seventh axis 62. The base 36, the outer frame 38, and the plurality of interior support walls 40 of the fourth side bolster 28 have a thickness 46 along the seventh axis 62 that provides rigidity along the seventh axis 62 to provide lateral side support for an occupant of the seat assembly 10.

The outer frame 38 of the fourth side bolster 28 includes first and second angled side walls 48, 50. The plurality of interior support walls 40 and the first and second angled side walls 48, 50 of the fourth side bolster 28 are angled relative to an eighth axis 64 that is perpendicular to the seventh axis 62. Force against the fourth side bolster 28 along the eighth axis 64 flexes the angled side walls 48, 50 and the plurality of interior walls 40 allowing the fourth side bolster 28 to partially collapse, providing cushioned compliance when a passenger bumps into the fourth side bolster 28.

Figure 3A:
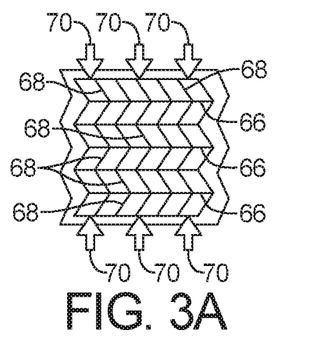
FIG. 3A is a schematic diagram illustrating how a side bolster flexes in response to forces.
Figure 3B:
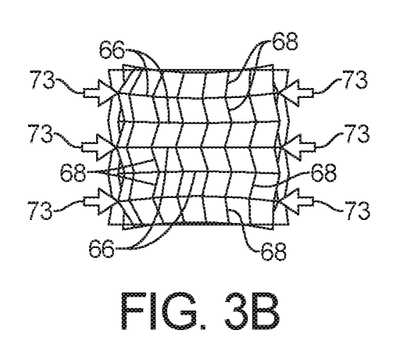
FIG. 3B is a schematic diagram illustrating how a side bolster is substantially rigid in response to forces.

Referring to FIG. 3A and FIG. 3B, a schematic structure diagram illustrates how the first, second, third and fourth side bolsters 16, 20, 24, 28 operate. Where the straight lines 66 represent the base 36, the outer frame 38, and the plurality of interior support walls 40, along the first, third, fifth and seventh axis 44, 54, 58, 62 and the angled lines 68 represent the interior support walls 40 and the first and second angled side walls 48, 50 relative to the second, fourth, sixth and eighth axis 52, 56, 60, 64.

Referring to FIG. 3A, force on the side bolsters 16, 20, 24, 28 along the second, fourth, sixth and eighth axis 52, 56, 60, 64, as indicated by arrows 70 results in flexing of the interior support walls 40 and the first and second angled side walls 48, 50, as represented by the angled lines 68. As the interior support walls 40 and the first and second angled side walls 48, 50 flex, the side bolsters 16, 20, 24, 28 collapse in an accordion like manner.

Referring to FIG. 3B, force on the side bolsters 16, 20, 24, 28 along the first, third, fifth and seventh axis 44, 54, 58, 62, as indicated by arrows 73, does not result in flexing of the interior support walls 40 and the side bolsters 16, 20, 24, 28 do not collapse, providing rigid support in response to lateral forces against the side bolsters 16, 20, 24, 28 from an occupant sitting in the seat assembly 10.

The support members 32 of each side bolster 16, 20, 24, 28 may be made from any suitable material that provides appropriate rigidity and flexibility characteristic. In an exemplary embodiment, the support members 32 are made from a thermoplastic polyurethane or TPU. TPU is any class of polyurethane plastics and can have multiple controllable properties such as elasticity, transparency, resistance to oil and grease and resistance to abrasion. These characteristics provide both the flexibility and rigidity needed for the present application, as well as providing a material that will withstand the wear expected by the seat assembly 10 within a vehicle.

TPU is a thermoplastic elastomers consisting of linear segmented block copolymers composed of hard and soft segments. Alternating sequences of hard and soft segments or domains formed by the reaction of: (1) diisocyanates with short-chain diols (so-called chain extenders) and (2) diisocyanates with long-chain diols. By varying the ratio, structure and/or molecular weight of reaction compounds, TPU having vast variety of characteristics can be produced. This allows the TPU to be fine-tuned to the desired final properties of the material. For example, a greater ratio of hard to soft segments will result in a more rigid TPU, while the reverse is also true. By using TPU or similar materials for the support member of the side bolsters, the flexibility of the side bolsters along the second, fourth, sixth and eighth axis 52, 56, 60, 64 can be tuned to provide desired firmness and compliance, and the rigidity of the side bolsters 16, 20, 24, 28 along the first, third, fifth and seventh axis 44, 54, 58, 62 can be tuned to provide adequate support for the passenger seated within the seat assembly 10.

Further, by using thermoplastic materials, the support members 32 can be made using additive manufacturing methods. This allows the support members 32 to incorporate complex designs that would be more difficult using conventional molding techniques.

Figure 4:
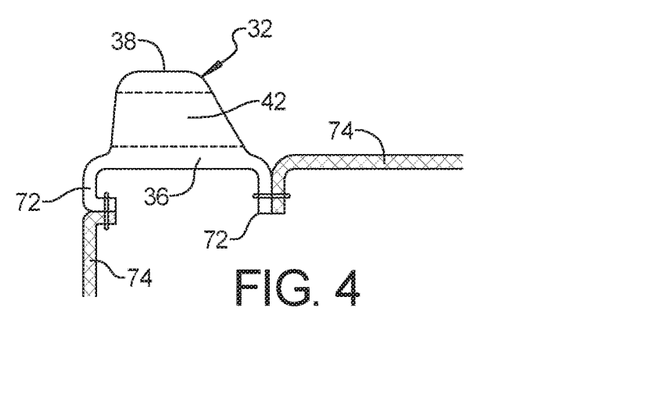
FIG. 4 is a schematic sectional view of a side bolster attached to a seat assembly according to an exemplary embodiment.

Referring to FIG. 4, the support members 32 of each of the first, second, third and fourth side bolsters 16, 20, 24, 28 further includes a flange 72 extending from a bottom edge of the base 36. The flange 72 of each support member 32 is attached to an outer covering 74 of the seat assembly 10 to secure the side bolsters 16, 20, 24, 28 to the seat assembly 10. In the exemplary embodiment shown in FIG. 4, the flange 72 is sewn to the outer covering 74 of the seat assembly 10. It should be understood by those skilled in the art that the flange 72 of the support members 32 of each of the first, second, third and fourth side bolsters 16, 20, 24, 28 can be secured to the outer covering 74 of the seat assembly 10 by any suitable means. By way of non-limiting examples, the flange 72 may be attached to the outer covering 74 of the seat assembly 10 by adhesives, rivets, zippers, snaps or other suitable means.

Figure 5:
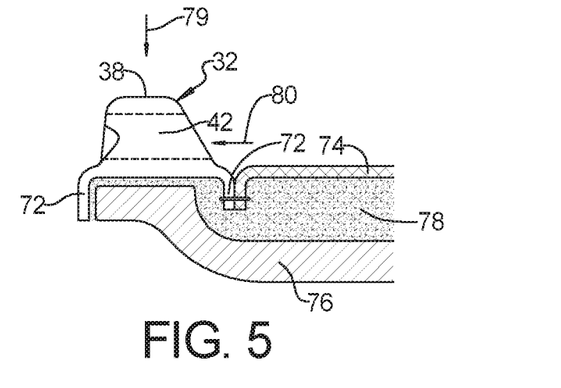
FIG. 5 is a schematic sectional view of a side bolster attached to a seat assembly according to an exemplary embodiment.

Referring to FIG. 5, the support member 32 of each of the first, second, third and fourth side bolsters 16, 20, 24, 28 may be attached to the outer covering 74 of the seat assembly 10 with the support member 32 positioned adjacent a structural element 76 of the seat assembly 10. Cushioned filler 78 between the structural element 76 and the outer covering 74 provides comfort for the occupant of the seat assembly 10. The side bolsters 16, 20, 24, 28 provide cushion in response to the occupant hitting the structural element 76 of the seat assembly 10 when the occupant enters or leaves the seat assembly 10, as indicated by arrow 79, while providing lateral side support for the occupant when seated, as indicated by arrow 80.

Figure 6:
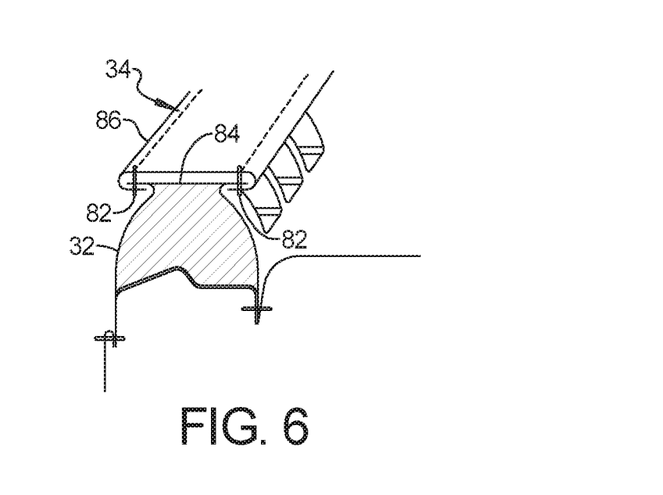
FIG. 6 is a perspective sectional view of a side bolster having an outer trim member according to an exemplary embodiment.

Referring to FIG. 6, in an exemplary embodiment, the support member 32 of each the side bolsters 16, 20, 24, 28 includes flanges 82 extending from a top surface 84. The outer trim member 34 comprises a decorative outer covering 86 that extends across the top surface 84 of the support member 32 and is attached thereto. The decorative outer covering 86 may be the same material as the outer covering 74 of the seat assembly 10, or may be a different color or material to provide decorative aspects to the seat assembly 10. The decorative outer covering 86 may be attached to the flanges 82 extending from the top surface 84 by adhesives, or, as shown in FIG. 6, sewn to the flanges 82 extending from the top surface 84 of the support member 32.

Figure 7:
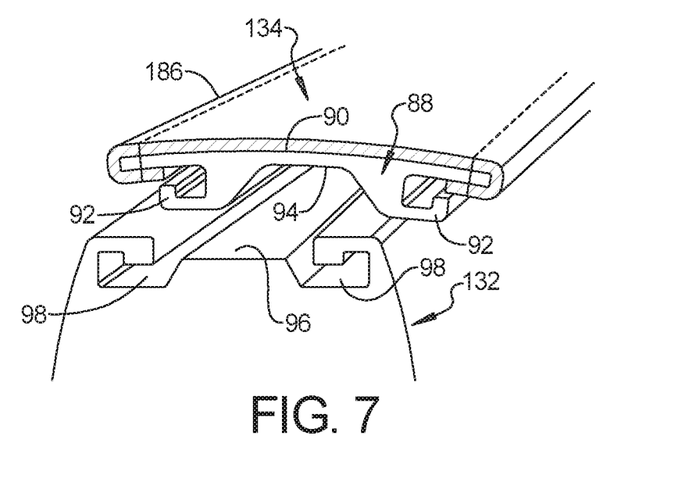
FIG. 7 is an exploded perspective sectional view of a side bolster having an outer trim member according to an exemplary embodiment.

Referring to FIG. 7, in an exemplary embodiment, an outer trim member 134 of each of the first, second, third and fourth side bolsters 16, 20, 24, 28 includes a rigid substrate 88 and a decorative outer covering 186 attached to a top surface 90 of the rigid substrate 88. The decorative outer covering 186 may be the same material as the outer covering 74 of the seat assembly 10, or may be a different color or material to provide decorative aspects to the seat assembly 10. The decorative outer covering 186 may be attached to the top surface 90 of the rigid substrate 88 by adhesives, or, as shown in FIG. 7, sewn to flanges 182 extending outward from the top surface 90 of the rigid substrate 88.

Figure 8:
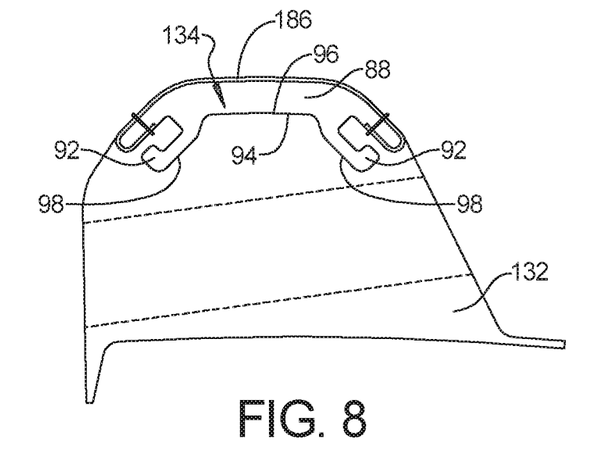
FIG. 8 is a perspective side sectional view of the side bolster shown in FIG. 7, wherein the outer trim member is attached to the support member.

The rigid substrate 88 of each outer trim member 134 includes interlocking members 92 on a bottom surface 94. Each of the support members 132 includes an outer surface 96 including corresponding interlocking members 98. Referring to FIG. 8, the interlocking members 92 of the rigid substrate 88 engage the corresponding interlocking members 98 of the support member 132 and secure the outer trim members 134 to the support members 132 of each of the first, second, third and fourth side bolsters 16, 20, 24, 28. As shown in FIG. 7 and FIG. 8, the rigid substrate 88 includes male interlocking members 92 extending from the bottom surface 94, and the outer surface 96 of the support member 132 includes corresponding female interlocking members 98 formed therein that receive the male interlocking members 92 of the rigid substrate 88 to secure the outer trim member 134 to the support member 132.

Figure 9:
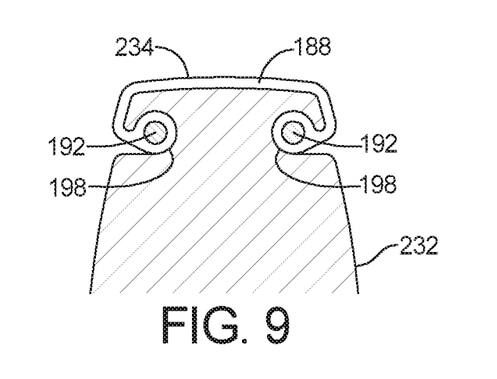
FIG. 9 is a side sectional view of a side bolster having an outer trim member according to an exemplary embodiment.

Referring to FIG. 9, another exemplary embodiment is shown where an outer trim member 234 includes a rigid substrate 188 includes male interlocking members 192 extending from the bottom surface, and the support member 232 includes corresponding female interlocking members 198 formed along sides adjacent to an outer surface 196. The male interlocking members 192 wrap around the outer surface 196 of the support member 232 to engage the female interlocking members 198 to secure the outer trim member 234 to the support member 232.

Figure 10:
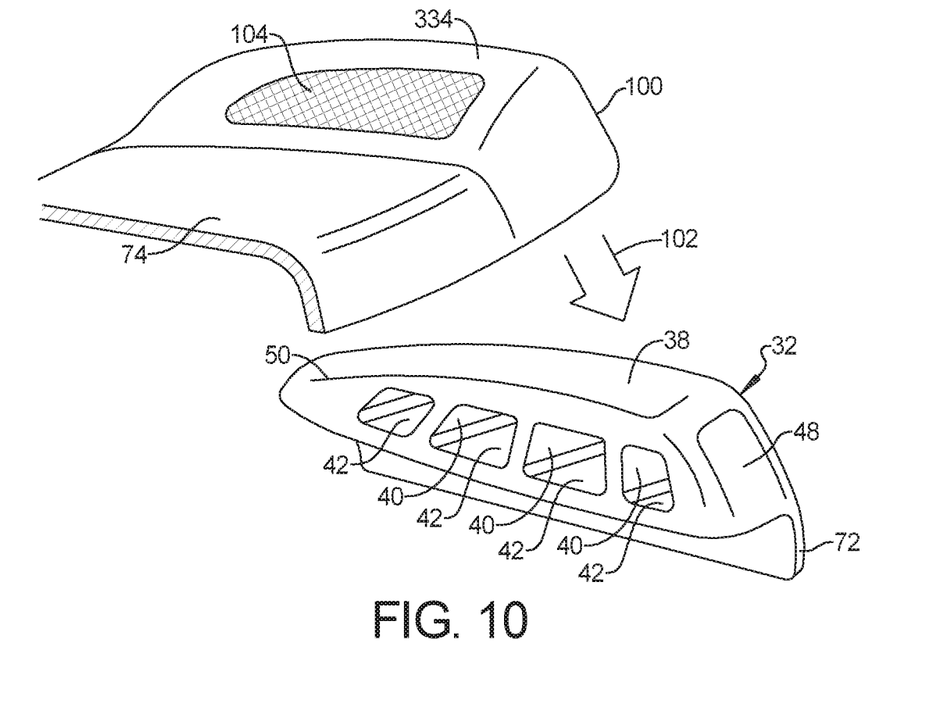
FIG. 10 is an exploded perspective view of a side bolster and an outer trim member according to an exemplary embodiment.
Figure 11:
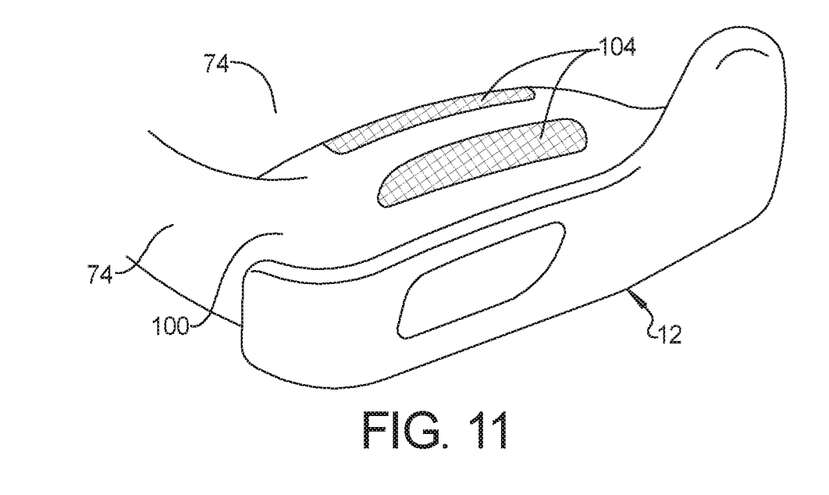
FIG. 11 is a perspective view of the side bolster shown in FIG. 10, wherein the outer trim member is attached to the support member.

Referring to FIG. 10, in an exemplary embodiment, an outer trim member 334 of each of the first, second, third and fourth side bolsters 16, 20, 24, 28 comprises a covering 100 extending over the support member 32. The exploded view of FIG. 9 shows the outer trim member 334 being placed onto the support member 32, as indicated by arrow 102. Referring to FIG. 11, the outer trim member 334 is attached to the outer covering 74 of the seat assembly 10 and the flange 72 of the support member 32 to secure the outer trim member 334 over the support member 32. In an exemplary embodiment, the outer trim member 334 includes a decorative mesh cover 104 aligned with the passages 42 formed within the support member 32. The mesh cover 104 is adapted provide a more visually appealing appearance to the side bolsters 16, 20, 24, 28 while allowing air and light to pass through the mesh cover 104 and through the passages 42 formed within the support member 32.

Figure 12:
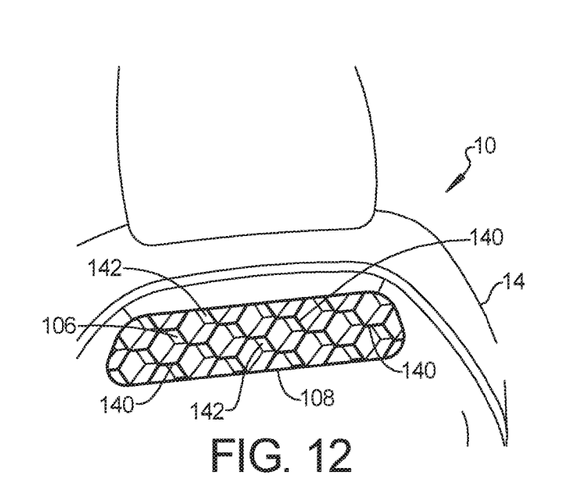
FIG. 12 is a perspective view of a seat assembly having a back insert formed within the seat back according to an exemplary embodiment.
Figure 13:
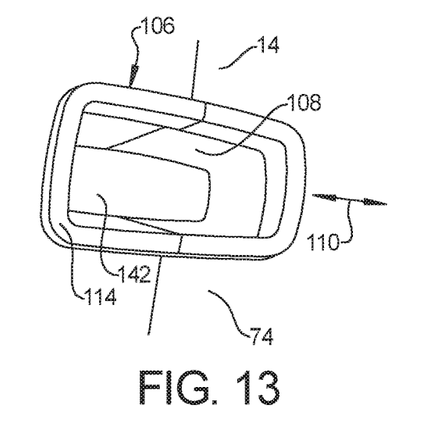
FIG. 13 is a perspective view of a seat assembly having a back insert according to an exemplary embodiment.

Referring to FIG. 12 and FIG. 13, a seat assembly according to another exemplary embodiment further includes a back insert 106 formed within the seat back 14. The back insert 106 is formed within and extends through the seat back 14. The back insert 106 includes a perimeter frame 108, and at least one interior support wall 140 that defines a plurality of back passages 142 extending through the seat back to allow light and air to pass through the seat back 14. Referring again to FIG. 12, in an exemplary embodiment, the back insert 106 includes a plurality of interior support walls 140 that define a plurality of back passages 142. The interior support walls 140 of the back insert 106 provide rigidity along a ninth axis 110, while providing the ability to flex within a plane perpendicular to the ninth axis 110 to allow the seat back 14 to conform to an occupant sitting within the seat assembly 10.

Figure 14:
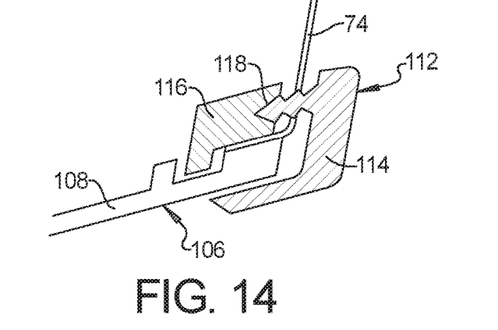
FIG. 14 is a sectional view of a back insert being attached to the outer covering of the seat back according to an exemplary embodiment.

The perimeter frame 108 of the back insert 106 may be secured within the seat back 14 by any suitable means. Referring to FIG. 14, in one exemplary embodiment, the perimeter frame 108 is secured within the seat back 14 by a two-piece trim ring 112. The two-piece trim ring 112 includes an outer ring 114 that extends around the perimeter frame 108 and wraps over the surrounding outer covering 74 of the seat assembly 10. The two-piece trim ring 112 further includes a corresponding inner ring 116 that extends around the perimeter frame 108 beneath the outer covering 74 of the seat assembly 10. The outer ring 114 includes a male member 118 that extends through the outer covering 74 and snaps into the inner ring 116.

Figure 15:
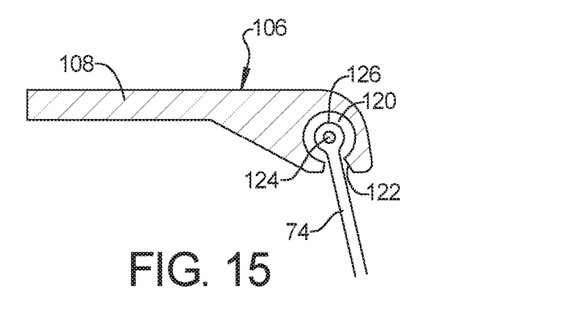
FIG. 15 is a sectional view of a back insert being attached to the outer covering of the seat back according to an exemplary embodiment.
Figure 16:
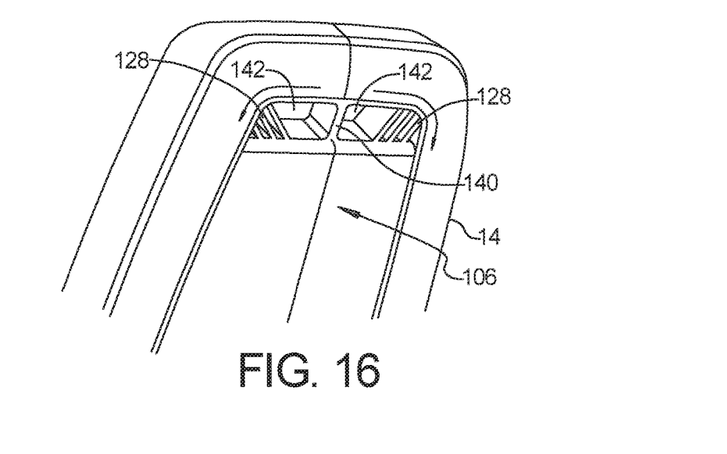
FIG. 16 is a perspective view of a seat back having a back insert according to an exemplary embodiment.

Referring to FIG. 15, in another embodiment, a perimeter frame 208 includes an outward facing channel 120 having a narrow slot opening 122 extending around the perimeter frame. Edges of the outer covering 74 of the seat assembly 10 includes a draw-string 124 embedded therein, forming an enlarged lip 126 at the edge of the outer covering 74 of the seat assembly 10 extending around the perimeter frame 208. The enlarged lip 126 of the edge of the outer covering 74 snaps into the channel 120 formed within the perimeter frame 208 to secure the perimeter frame 208 to the outer covering 74 of the seat assembly 10. Referring to FIG. 16, in yet another embodiment, the perimeter frame 306 is attached to edges of the outer covering 74 of the seat assembly 10 by at least one zipper 128.

A seat assembly 10 of the present disclosure offers several advantages. A seat assembly 10 of the present disclosure includes side bolsters 16, 20, 24, 28 that provide rigid support to lateral movement of an occupant within the seat assembly 10, while also providing compliance when an occupant bumps into the side bolsters 16, 20, 24, 28 when entering or exiting the seat assembly 10. The seat assembly 10 of the present disclosures also provides a seat that includes portions that provide structural support for the occupant while also allowing air and light to pass through. This aspect aids in thermal management within the vehicle, comfort for the occupant and provides aesthetic design features. Using thermoplastic materials, such as TPU, will allow the side bolsters 16, 20, 24, 28 of the seat assembly 10 to be manufactured using additive manufacturing techniques, which in turn will allow the side bolsters 16, 20, 24, 28 to include complex design characteristics that will improve the performance of the side bolsters 16, 20, 24, 28 and would otherwise be difficult or impossible using traditional molding techniques. Further, using thermoplastic materials such as TPU will allow the flexibility and rigidness characteristics of the side bolsters 16, 20, 24, 28 of the seat assembly 10 to be tuned to specifications according to varying applications.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A seat assembly for a vehicle, the seat assembly comprising:
a seat base adjustably fixed to a floor of the vehicle; and
a seat back pivotably disposed to a rear edge of the seat base, and wherein the seat back includes a first side bolster on a first side of the seat back, the first side bolster including a support member and an outer trim member, the support member including a base, and an outer frame, the outer frame and the base defining a passage extending through the first support member to allow light and air to pass through the first support member, the first side bolster adapted to provide support for a passenger seated in the seat assembly and to allow light and air to pass therethrough.

2. The seat assembly of claim 1, wherein the support member further includes at least one interior support wall, the outer frame, the base, and the at least one interior support wall defining a plurality of hexagonal shaped passages extending through the first support member to allow light and air to pass through the first support member.

3. The seat assembly of claim 2, wherein the at least one interior support wall is substantially parallel to a first axis.

4. The seat assembly of claim 3, wherein the base, the outer frame, and the at least one interior support wall have a thickness along the first axis, the thickness of the base, the outer frame, and the at least one interior support wall providing rigidity along the first axis and providing side support for an occupant of the seat assembly.

5. The seat assembly of claim 4, wherein the outer frame includes first and second angled side walls, the at least one interior support wall and the first and second angled side walls being angled relative to a second axis that is perpendicular to the first axis, further wherein force against the first side bolster along the second axis flexes the angled side walls and the at least one interior support wall allowing to first side bolster to partially collapse and provide cushioned compliance when an occupant bumps into the first side bolster when entering and exiting the seat assembly.

6. The seat assembly of claim 5, wherein the base of the first support member further includes a flange extending from a bottom edge of the base, the flange being attached to the seat back to secure the first side bolster onto the seat back.

7. The seat assembly of claim 6, wherein the flange is sewn to an outer covering of the seat back.

8. The seat assembly of claim 7, wherein the outer trim member includes a rigid substrate and an outer covering attached to a top surface of the rigid substrate, the rigid substrate including interlocking members on a bottom surface, the support member including an outer surface including corresponding interlocking members, the interlocking members of the rigid substrate engaging the corresponding interlocking members of the support member and securing the outer trim member to the support member.

9. The seat assembly of claim 8, wherein the rigid substrate includes male interlocking members extending from a bottom surface, and the outer surface of the support member includes corresponding female interlocking members formed therein.

10. The seat assembly of claim 7, wherein the outer trim member comprises a covering extending over the first side bolster, the outer trim attached to the seat back and the flange of the base.

11. The seat assembly of claim 10, wherein the outer trim includes a decorative mesh cover aligned with the passages formed within the support member, the mesh cover adapted to allow air and light to pass through the mesh cover and through the passages formed within the support member.

12. The seat assembly of claim 7, wherein the seat back further includes a second side bolster on a second side of the seat back, the second side bolster being substantially identical to the first side bolster.

13. The seat assembly of claim 12, wherein the seat base includes third and fourth side bolsters on opposing first and second sides of the seat base, the third and fourth side bolsters being substantially identical to the first and second side bolsters.

14. The seat assembly of claim 13, further including a back insert formed within the seat back, the back insert including a perimeter frame, and at least one interior support wall that define a plurality of back passages extending through the seat back to allow light and air to pass through the seat back.

15. A seat assembly for a vehicle, the seat assembly comprising:
a seat base adjustably fixed to a floor of the vehicle;
a seat back pivotably disposed to a rear edge of the seat base;
a first side bolster mounted onto a first side of the seat back;
a second side bolster mounted onto a second side of the seat back;
a third side bolster mounted onto a first side of the seat base;
a fourth side bolster mounted onto a second side of the seat base; and
a back insert mounted within the seat back;
each of the first, second, third and fourth side bolsters including a support member and an outer trim member, the support members each including a base, an outer frame and a plurality of interior support walls, the outer frame and the plurality of interior support walls defining a plurality of passages extending through each support member to allow light and air to pass through each of the support members.

16. The seat assembly of claim 15, wherein each of the plurality of interior support walls of the first side bolster are substantially parallel to a first axis and the base, the outer frame, and the plurality of interior walls of the first side bolster have a thickness along the first axis that provides rigidity along the first axis to provide side support for an occupant of the seat assembly, the outer frame including first and second angled side walls, the plurality of interior support walls and the first and second angled side walls of the first side bolster being angled relative to a second axis that is perpendicular to the first axis, further wherein force against the first side bolster along the second axis flexes the angled side walls and the plurality of interior support walls allowing the first side bolster to partially collapse and provide cushioned compliance when an occupant bumps into the first side bolster when entering and exiting the seat assembly;
wherein, each of the plurality of interior support walls of the second side bolster are substantially parallel to a third axis and the base, the outer frame, and the plurality of interior support walls of the second side bolster have a thickness along the third axis that provides rigidity along the third axis to provide side support for an occupant of the seat assembly, the outer frame including first and second angled side walls, the plurality of interior walls and the first and second angled side walls of the second side bolster being angled relative to a fourth axis that is perpendicular to the third axis, further wherein force against the first side bolster along the fourth axis flexes the angled side walls and the plurality of interior support walls allowing the second side bolster to partially collapse and provide cushioned compliance when an occupant bumps into the second side bolster when entering and exiting the seat assembly;
wherein, each of the plurality of interior support walls of the third side bolster are substantially parallel to a fifth axis and the base, the outer frame, and the plurality of interior support walls of the third side bolster have a thickness along the fifth axis that provides rigidity along the fifth axis to provide side support for an occupant of the seat assembly, the outer frame including first and second angled side walls, the plurality of interior support walls and the first and second angled side walls of the third side bolster being angled relative to a sixth axis that is perpendicular to the fifth axis, further wherein force against the third side bolster along the sixth axis flexes the angled side walls and the plurality of interior support walls allowing the third side bolster to partially collapse and provide cushioned compliance when an occupant bumps into the third side bolster when entering and exiting the seat assembly; and
wherein, each of the plurality of interior support walls of the fourth side bolster are substantially parallel to a seventh axis and the base, the outer frame, and the plurality of interior support walls of the fourth side bolster have a thickness along the seventh axis that provides rigidity along the seventh axis to provide side support for an occupant of the seat assembly, the outer frame including first and second angled side walls, the plurality of interior support walls and the first and second angled side walls of the fourth side bolster being angled relative to an eighth axis that is perpendicular to the seventh axis, further wherein force against the fourth side bolster along the eighth axis flexes the angled side walls and the plurality of interior support walls allowing the fourth side bolster to partially collapse and provide cushioned compliance when an occupant bumps into the fourth side bolster when entering and exiting the seat assembly.

17. The seat assembly of claim 16, wherein the base of each of the support members of each of the first, second, third and fourth side bolsters further includes a flange extending from a bottom edge of the base, the flanges being attached to an outer covering of the seat, further wherein, the outer trim member of each of the first, second, third and fourth side bolsters includes a rigid substrate and an outer covering attached to a top surface of the rigid substrate, the rigid substrate of each outer trim member including interlocking members on a bottom surface, each of the support members including an outer surface including corresponding interlocking members, the interlocking members of the rigid substrate engaging the corresponding interlocking members of the support member and securing the outer trim members to the support members of each of the first, second, third and fourth side bolsters.

18. The seat assembly of claim 16, wherein the base of each of the support members of each of the first, second, third and fourth side bolsters further includes a flange extending from a bottom edge of the base, the flanges being attached to an outer covering of the seat, further wherein the outer trim member of each of the first, second, third and fourth side bolsters comprises a covering extending over the first side bolster, the outer trim attached to the seat and the flange of the base and including a decorative mesh cover aligned with the passages formed within the support member, the mesh cover adapted to allow air and light to pass through the mesh cover and through the passages formed within the support member.

19. The seat assembly of claim 16, wherein the back insert includes a perimeter frame, and at least one interior support wall that define a plurality of back passages extending through the seat back to allow light and air to pass through the seat back.

* * * * *